United States Patent
Kang

(10) Patent No.: US 6,407,977 B1
(45) Date of Patent: Jun. 18, 2002

(54) METHOD FOR CONTROLLING EQUALIZER CHARACTERISTICS OF REPRODUCED SIGNALS

(75) Inventor: Byung Gyoo Kang, Kyunggi-do (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 09/377,496

(22) Filed: Aug. 20, 1999

(30) Foreign Application Priority Data

Aug. 21, 1998 (KR) .............................. 98-34333

(51) Int. Cl.[7] .................................. G11B 7/00
(52) U.S. Cl. ................... 369/124.01; 369/59.1; 369/47.1
(58) Field of Search ........................... 369/44.28, 44.27, 369/44.34, 47.1, 47.11, 47.15, 47.25, 47.28, 47.36, 47.41, 53.1, 53.11, 53.41, 59.1, 124.01

(56) References Cited

U.S. PATENT DOCUMENTS 5,323,373 A * 6/1994 Horimai ................ 369/110.01

* cited by examiner

Primary Examiner—Muhammad Edun
(74) Attorney, Agent, or Firm—Birch, Stewart, Kolasch & Birch, LLP

(57) ABSTRACT

A method and apparatus for adjusting equalization characteristics of signals reproduced from an optical disk rotating at a constant angular velocity. The method according to the present invention includes measuring the linear velocity of an arbitrary track on a rotating optical disk medium and adjusting equalization characteristics of signals reproduced from the track based on the measured linear velocity. The method provides high fidelity data reproduction by allowing fine adjustment of equalization characteristics and general applicability, by exploiting signals recorded on the particular optical disk medium read.

10 Claims, 4 Drawing Sheets

METHOD FOR CONTROLLING EQUALIZER CHARACTERISTICS OF REPRODUCED SIGNALS

BACKGROUND OF THE INVENTION

1. Field of the Invention

The present invention relates to a method and an apparatus for controlling equalization characteristics of signals reproduced from an optical disk medium.

2. Description of the Related Art

Methods for recording and/or reproducing information on or from an optical disk are in general classified into constant linear velocity (hereinafter, referred to as CLV) schemes and constant angular velocity (hereinafter, referred to as CAV) schemes. If an optical disk having data recorded by the CLV method is played by the same method, the gain of an equalizer for correcting distortions in signals reproduced by a pickup is fixed all the time because the linear velocity of data pits remains constant over all tracks. In contrast, provided that the disk is played by the CAV method, the linear velocity of data pits increases in the radial direction from inner peripheries to outer peripheries, which implies that the frequency characteristics of reproduced signals vary with tracks.

Shown in FIG. 1A is a conventional apparatus for reproducing, at a constant angular velocity, an optical disk 10 with data recorded by the CLV scheme. The apparatus includes a pickup 11 for retrieving information recorded on the optical disk 10 using a laser beam, a sled motor 12a for moving the pickup 11 in the radial direction, a spindle motor 12b for rotating the optical disk 10, a drive unit 30 for driving the sled motor 12a and the spindle motor 12b, a radio frequency (RF) unit 20 for equalizing and shaping signals reproduced from the optical disk 10 by the pickup 11, a servo unit 40 for controlling the drive unit 30 by utilizing focus and tracking error signals obtained from the pickup 11 and for detecting sync signals from the output of the RF unit 20, a digital signal processing unit 50 for retrieving recorded digital data from the output of the RF unit 20, and a microcomputer 60 for supervising the overall operation of the apparatus.

As shown in FIG. 1B, the RF unit 20 further includes an RF summing circuit 21 for summing RF signals created by sub-beams in the pickup 11, an RF equalizer 22 for equalizing signals from the RF summing circuit 21 so that signals created by data pits of various lengths (3T–11T) have the same magnitude, a comparator 23 for generating binary pulse signals by comparing the equalized signals and a slice level, and an integrator 24 for generating the slice level by integrating the binary signals to obtain their average level.

In the above apparatus, given a user's request to play the optical disk 10, the microcomputer 60 rotationally drives the optical disk 10 at a constant angular velocity, allowing the pickup 11 to retrieve RF signals from the optical disk 10. Signals yielded by two sub-beams in the pickup 11 are added in the RF summing circuit 21 and applied to the equalizer 22, wherein the signals are equalized. The equalizer coefficients which determine the equalizer characteristics are set by the microcomputer 60.

When the optical disk 10 is first accessed, information on the disk is collected and stored in an internal memory (not shown) within microcomputer 60. Referring to the information, the microcomputer 60 determines the radius r, (the distance between the currently accessed track and the center of the disk 10), and examines which region the radius r belongs to from among several regions 1-2, 2-3, 3-4, . . . as shown in FIG. 2. Each region has an associated equalizer gain curve so that a set of equalizer coefficients can be chosen according to the region to which the radius r belongs. For example, if the detected radius r is 2.1, then the equalizer gain curve corresponding to the radius r is B, which indicates that the equalizer gain for 11T signals retrieved from the disk is a.

The microcomputer 60 transmits the chosen set of equalizer coefficients to the RF unit 20 so that the RF equalizer 22 has gain characteristics as shown in the gain curve B. Setting the transmitted coefficients, the RF equalizer 22 equalizes input RF signals with the gain characteristics. The RF equalizer 22 thus controls the gains of frequency sub-bands of reproduced signals, the entire frequency band of the reproduced signal consisting of these sub-bands. The comparator 23 compares the equalized RF signals with a slice level and yields binary signals according to the comparison result. The integrator 24 integrates the binary signals to obtain the average or DC level of the binary signals, wherein the obtained average level is fed back to the comparator 23 as the slice level. The binary signals are processed by the digital signal processing unit 50 and original digital data are finally retrieved.

In the method for adjusting equalization characteristics according to the radius r, the equalizer gain for signals yielded by data pits of the same length on tracks of similar radii may vary depending upon which gain curve is employed. For example, if the radius r is 1.9, the equalizer gain curve A is chosen and the equalizer gain for 11T signals is b (as shown in FIG. 2). Compared to the previous example wherein the equalizer gain for the same signals is a, there is a fairly big difference in the equalizer gain despite the fact that the two radii are similar. The discontinuity in the equalizer gains remarkably increases around the boundary of two regions partitioned by the radius r.

In addition, the relation between the radius and appropriate equalizer gain characteristics varies with disk types and disk makers. Considering this fact, therefore, the RF equalizer intended for improving signal qualities might distort reproduced signals if the RF equalizer coefficients are adjusted inappropriately.

SUMMARY OF THE INVENTION

Accordingly, the present invention is directed to a method and apparatus for adjusting equalization characteristics of signals reproduced from an optical disk that substantially obviates one or more of the problems due to limitations and disadvantages of the related art.

The present invention is also directed to a method and an apparatus for adjusting equalization characteristics of signals reproduced from an optical disk with varying linear velocities of tracks.

In accordance with the purpose of the invention, as embodied and broadly described, one aspect of the invention includes a method for adjusting equalization characteristics of signals reproduced from an optical disk medium, including detecting a linear velocity of a track on a rotating optical disk medium, and controlling equalization characteristics of signals reproduced from the track based on the detected linear velocity.

In another aspect, the invention includes an apparatus for adjusting equalization characteristics of signals reproduced from an optical disk medium, including a detector to detect a predetermined signal derived from a track of the optical disk medium and to output detection signals when the predetermined signal is detected, a device to generate an output signal representing a linear velocity of the track based on the detection signals, and a controller to control equalization characteristics for reproduced signals based on the output signal.

It is to be understood that both the foregoing general description and the following detailed description are exemplary and explanatory and are intended to provide further explanation of the invention as claimed.

The accompanying drawings are included to provide a further understanding of the invention and are incorporated in and constitute a part of this specification, illustrate several embodiments of the invention and together with the description serve to explain the principles of the invention.

BRIEF DESCRIPTION OF THE DRAWINGS

The accompanying drawings, which are included to provide a further understanding of the invention, illustrate the preferred embodiment of this invention, and together with the description, serve to explain the principles of the present invention.

In the drawings.

DETAILED DESCRIPTION OF THE PREFERRED EMBODIMENT

In order for the invention to be fully understood, a preferred embodiment thereof will now be described with reference to the accompanying drawings.

Figure 1A:
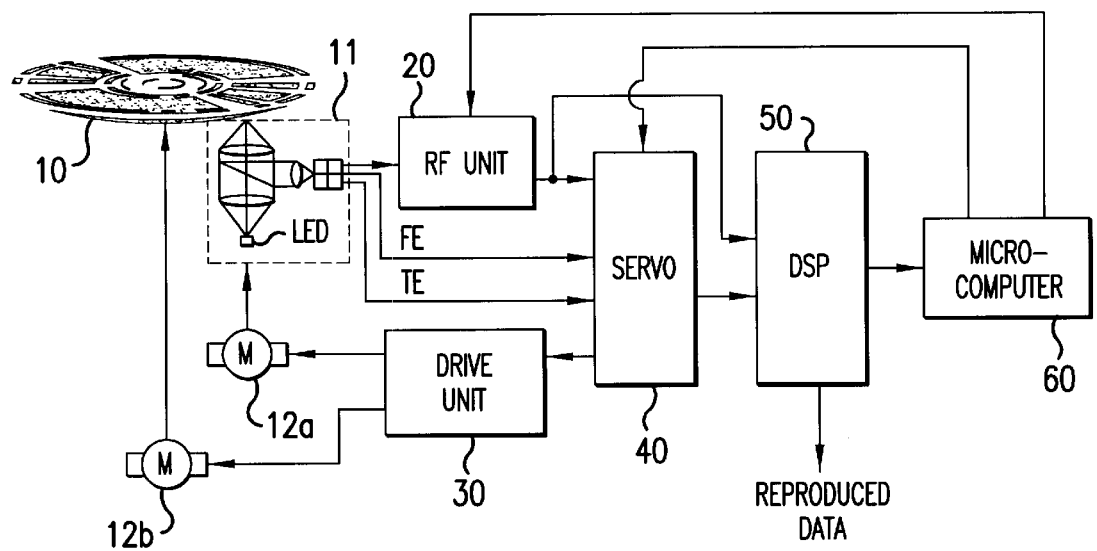
FIG. 1A is a schematic diagram of a conventional optical disk reproducing apparatus.
Figure 3:
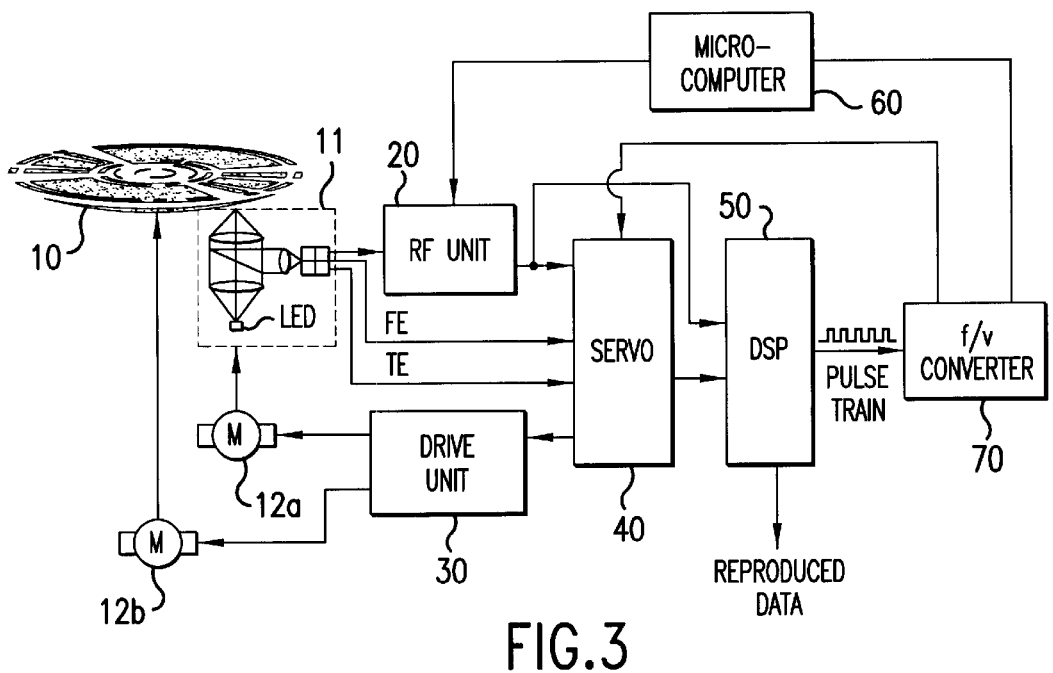
FIG. 3 is a schematic diagram of an apparatus according to an embodiment of the invention.

FIG. 3 illustrates an apparatus for adjusting equalization characteristics of reproduced signals embodying the present invention. All parts, except a frequency-to-voltage (F/V) converter 70, already appear in FIG. 1A, and are denoted by the same reference numbers with no additional detailed description.

Whenever detecting frame synchronization (i.e., "sync") in data restored from high frequency signals received from the RF unit 20, the digital signal processing unit (DSP) 50 generates a series (train) of pulses. The F/V converter 70 creates a voltage output proportional to the frequency of such a pulse train. Utilizing the voltage output, the microcomputer 60 adjusts the characteristics of the RF equalizer 22.

Figure 5:
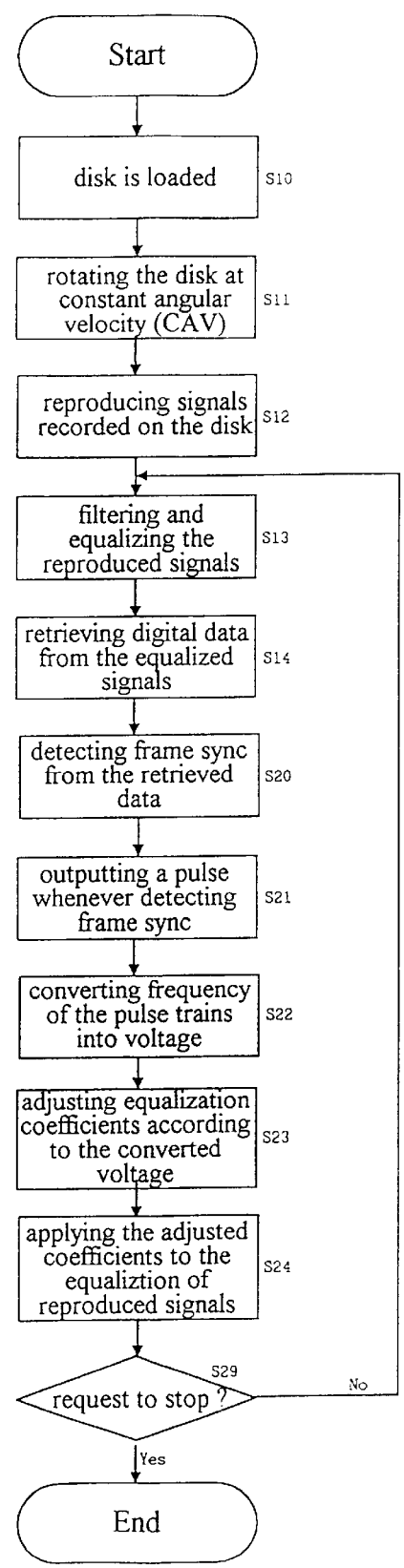
FIG. 5 is a flow chart of a method for adjusting equalization characteristics of reproduced signals according to the embodiment of the present invention.

With reference to the apparatus shown in FIG. 3 and the flow chart shown in FIG. 5, the method for adjusting equalization characteristics of reproduced signals in accordance with the present invention will now be described in detail.

Once the optical disk 10 is loaded (S10), the microcomputer 60 issues commands to the servo unit 40 and drive unit 30 so that the spindle motor 12b rotates the optical disk 10 at a constant angular velocity (S11).

Then track-following control begins, and the pickup 11 reproduces recorded signals along the tracks of the spinning optical disk 10 (S12). The RF unit 20 filters and equalizes the high frequency signals received from the pickup 11 to create binary signals (S13), and the servo unit 40 synchronizes its output clock in phase with the binary signals. Utilizing the synchronized clock output from servo unit 40 as a decoding clock, the DSP unit 50 retrieves originally recorded digital data from the binary signals obtained from the RF unit 20 (S14).

The retrieved digital data is basically composed of data frames. A frame sync signal in the data frame is detected by the DSP unit 50 (S20), the frequency of the frame sync signal being proportional to the linear velocity of the currently accessed track of the optical disk 10.

Along with retrieving data frames, the DSP unit 50 generates a pulse every time a frame sync signal (24 bits) is detected (S21). Such a generated pulse train is applied to the F/V converter 70 which generates a voltage output proportional to the frequency of the pulse train (S22). After converting the output voltage of the F/V converter 70 into a digital value, and recognizing the converted value, the microcomputer 60 chooses gain coefficients of the equalizer 22.

The converted digital value is also proportional to the frequency of the pulse train, which is in turn proportional to the linear velocity of the currently accessed track of the optical disk 10. Hence, this converted digital value may represent the linear velocity. The microcomputer 60 may, but need not, calculate the actual linear velocity of the track from this proportional digital value based on the particular, known proportionality relationships of the frame sync signal and the voltage output of the F/V converter 70 to the linear velocity of a track. Whether the microprocessor makes such a calculation depends on whether the gain coefficients of the equalizer 22 are stored in relation to the actual linear velocity of the track, or in relation to the converted digital value. The gain coefficients are stored in a look-up table in a memory (not shown) associated with the microcomputer 60, though other implementations are possible. Thus, the microcomputer 60 chooses gain coefficients of the equalizer 22 by accessing the look-up table based on the converted digital value or calculated actual linear velocity.

In response to a coefficient setting signal from the microcomputer 60, the RF unit 20 sets the chosen coefficients of the RF equalizer 22 (S23), thereby adjusting the equalization characteristics appropriately for frequency of RF signals reproduced from the disk. The RF equalizer 22 thus controls the gains of frequency sub-bands of reproduced signals, the entire frequency band of the reproduced signal consisting of these sub-bands.

Instead of the microcomputer 60 adjusting the values of the whole gain coefficients according to the current linear velocity, it can apply the setting signal to adjust only one or more coefficients for the specified signal, for example, 3T and/or 11T to the RF unit 20. This partial adjustment shall be applied to the case that the signal reproduction condition is satisfied by maintaining the level difference between 3T and 11T to be constant on the overall disk.

As the pickup 11 moves in the radial direction of the optical disk 10, the linear velocity of each track varies. To cope with this velocity variation, in conventional schemes, the equalization characteristics are modified based upon the region to which the currently accessed track belongs. On the other hand, in the present invention, the equalization characteristics are adjusted using the frequency of the oscillation signals. Therefore the adjustment process is performed continuously with the varying tracks. Moreover, the equalization characteristics adjustment can be always carried out since the adjustment is based upon the sync signals resident in the data frames.

Figure 1B:
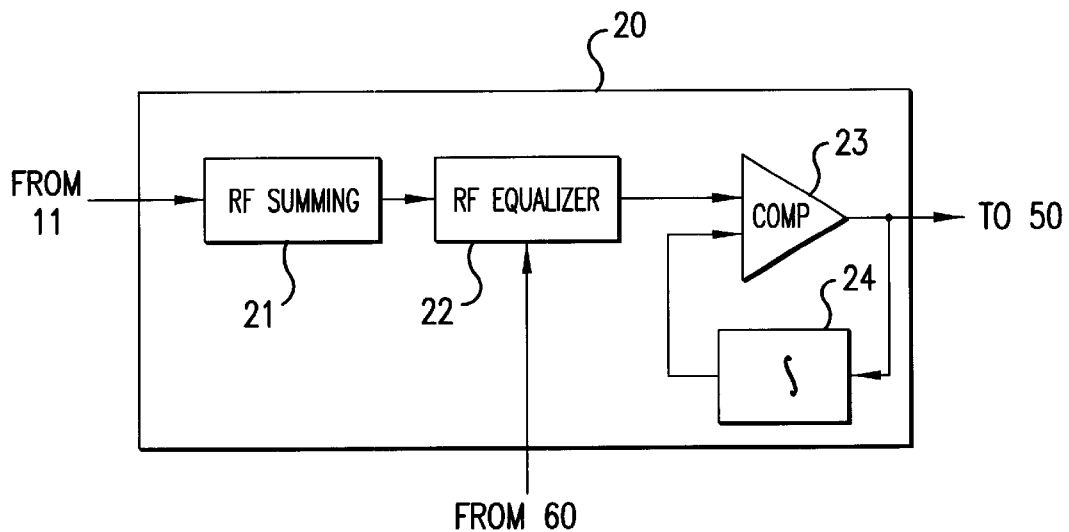
FIG. 1B is a detailed block diagram of the RF unit shown in FIG. 1A.

The signals equalized by the RF equalizer 22, with gains adjusted according to the linear velocity of a target track, are converted into binary signals by the comparator 23 and integrator 24 shown in FIG. 1B. Referring to the sync signals detected by the servo unit, the digital signal processing unit 50 retrieves original digital data from the binary signals (S24).

Figure 2:
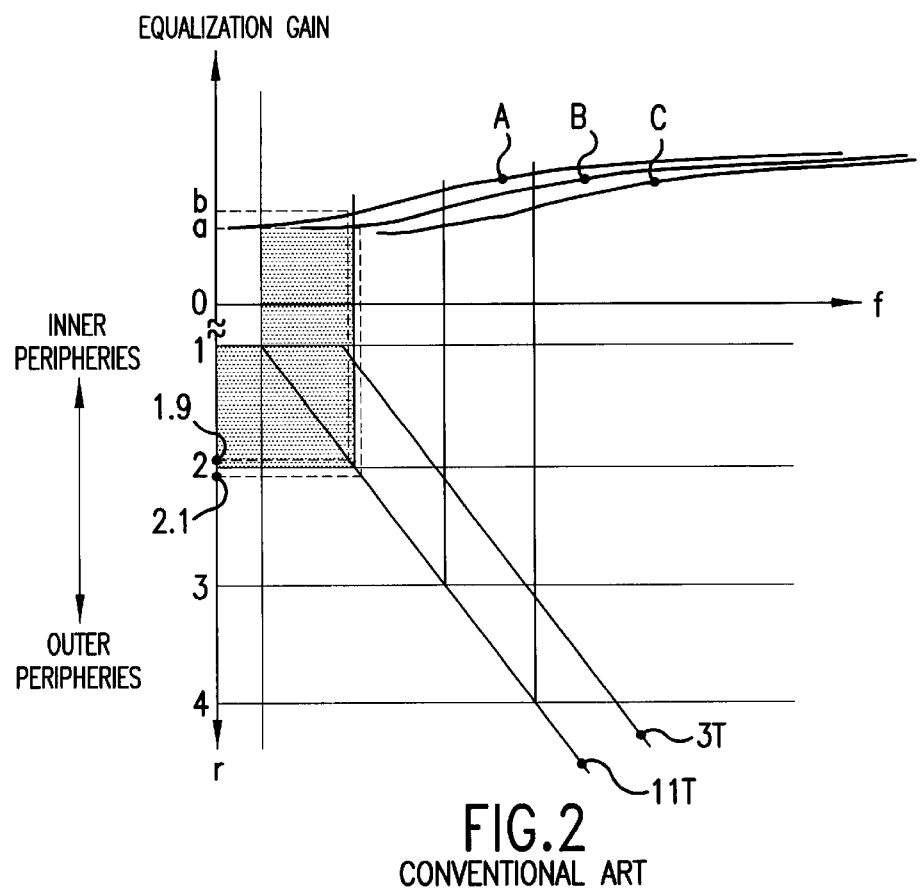
FIG. 2 is a graphical representation of equalization characteristics of reproduced signals adjusted by the apparatus shown in FIGS. 1A and 1B.
Figure 4:
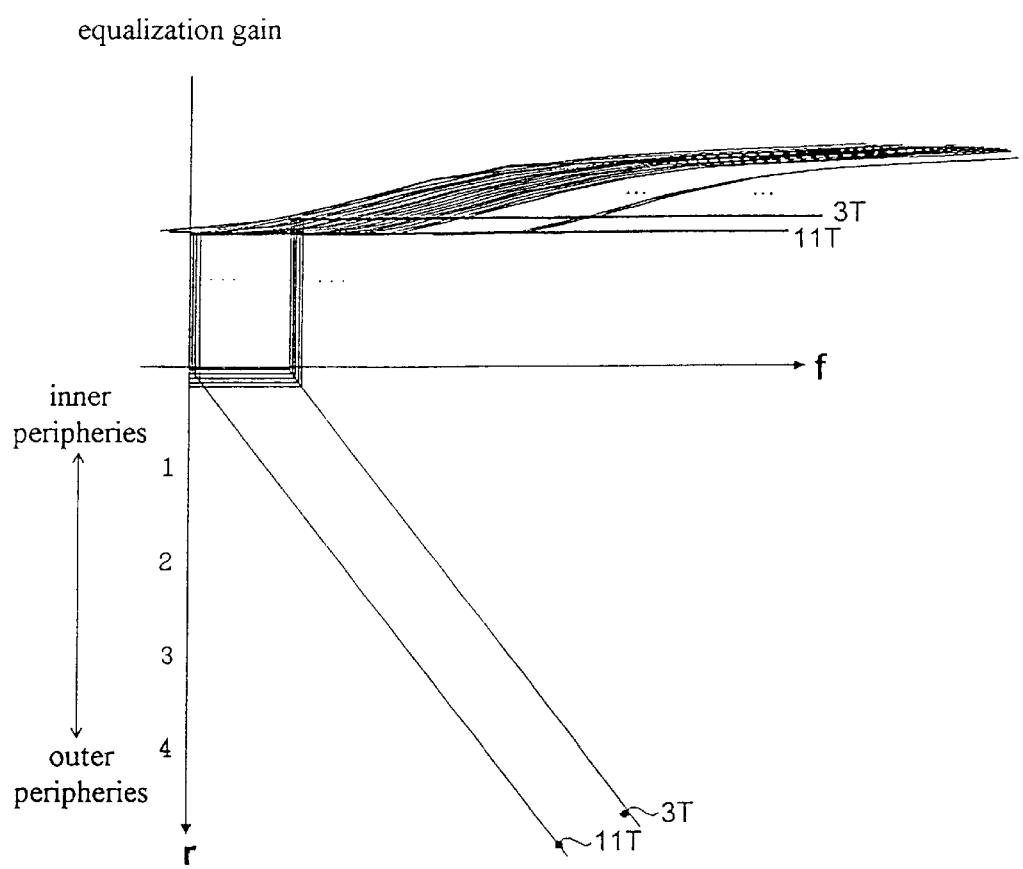
FIG. 4 is a graphical representation of equalization characteristics of reproduced signals adjusted by the apparatus according to the embodiment of the invention.

As shown in FIG. 4, in the method for adjusting equalization characteristics according to the present invention, the equalizer gain for signals yielded by data pits of the same length on tracks of similar radii varies only slightly, if at all. This is in contrast with the conventional example shown in FIG. 2, where there is a fairly big difference in the equalizer gain despite two similar radii. The method and apparatus of the present invention removes any discontinuity in the equalizer gains around the boundaries of the two regions partitioned by the radius r (shown in FIG. 2).

The invention may be embodied in other specific forms without departing from the sprit or essential characteristics thereof. For example, in the preferred embodiment, the oscillating signal is converted into a voltage output proportional to its frequency and the equalization characteristics are adjusted based on the voltage value. The equalization characteristics, however, can also be adjusted based on the number of the sync signals in a data frame counted for a certain time duration.

According to this other embodiment of the present invention, a detector detects predefined signals from an optical disk when the optical disk is loaded and begins to spin, a counter unit (not shown) counts the number of the detected signals for a preset time duration, and a gain adjuster adjusts the equalization characteristics of signals retrieved from the optical disk according to the counted value. The counter unit would replace element 70 in FIG. 3 and would perform a similar function. The counter unit may include, for example, a digital up/down counter, associated logic gates, and a D/A converter if needed.

The present embodiment is therefore to be considered in all respects as illustrative and not restrictive, the scope of the invention being indicated by the appended claims rather than by the foregoing description. All changes which come within the meaning and range of equivalency of the claims, therefore, are intended to be embraced therein.

In the present invention, the linear velocity of an arbitrary track on an optical disk medium rotating at a constant angular velocity is detected while recorded data are retrieved from the optical disk and equalization characteristics of reproduced signals are adjusted based on the detected linear velocity. Therefore, high fidelity data reproduction is attainable by allowing fine adjustment of equalization characteristics and general applicability is achievable by exploiting signals recorded on the optical disk medium.

What is claimed is:

1. A method for adjusting equalization characteristics of signals reproduced from an optical disk medium, comprising:

detecting a linear velocity of a track on a rotating optical disk medium, wherein said detecting includes calculating the linear velocity based on a frequency of frame sync signals; and controlling equalization characteristics of signals reproduced from the track based on the detected linear velocity.

2. The method of claim 1, wherein the controlling equalization characteristics include:

controlling gains of respective frequency sub-bands of the reproduced signals.

3. The method of claim 1, further comprising:

rotating the optical disk medium at constant angular velocity.

4. An apparatus for adjusting equalization characteristics of signals reproduced from an optical disk medium, comprising:

a detector to detect a predetermined signal derived from a track of the optical disk medium, and to output detection signals when the predetermined signal is detected;

a device to generate an output signal representing a linear velocity of the track based on the detection signals, said device including a counter to count a number of the predetermined signals detected for a preset time, and the output signal is a counted number; and a controller to control equalization characteristics for reproduced signals based on the output signal.

5. The apparatus of claim 4, wherein the controller calculates a linear velocity of a current track from the counted number, and controls the equalization characteristics based on the calculated linear velocity.

6. The apparatus of claim 4, wherein the device includes a converter to convert a frequency of the detection signal to a voltage, and the output signal is a voltage.

7. The apparatus of claim 6, wherein the controller calculates a linear velocity of a current track from the voltage and controls the equalization characteristics based on the calculated linear velocity.

8. The apparatus of claim 4, wherein the predetermined signal is a frame sync signal.

9. The apparatus of claim 4, wherein the controller controls gains of respective frequency sub-bands of the reproduced signals.

10. The apparatus of claim 4, further comprising:

a driver to rotate the optical disk medium at a constant angular velocity.

* * * * *